US008303085B2

(12) United States Patent
Uchiyama

(10) Patent No.: US 8,303,085 B2
(45) Date of Patent: Nov. 6, 2012

(54) LYOPHOBIC TREATMENT METHOD, NOZZLE PLATE, INKJET HEAD AND ELECTRONIC DEVICE

(75) Inventor: Hiroki Uchiyama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 12/723,497

(22) Filed: Mar. 12, 2010

(65) Prior Publication Data

US 2010/0231647 A1 Sep. 16, 2010

(30) Foreign Application Priority Data

Mar. 13, 2009 (JP) ................................. 2009-061680

(51) Int. Cl.
*B23P 17/00* (2006.01)
*B05D 5/00* (2006.01)

(52) U.S. Cl. .......................... 347/47; 427/466; 29/890.1

(58) Field of Classification Search .................... 347/47; 29/890.1; 427/256, 466
See application file for complete search history.

(56) References Cited

U.S. PATENT DOCUMENTS 7,814,657 B2 * 10/2010 Yokouchi ..................... 29/890.1
8,012,538 B2 * 9/2011 Yokouchi ...................... 427/256

FOREIGN PATENT DOCUMENTS

JP 2004-143622 A 5/2004
JP 2005-054067 A 3/2005
JP 2005-279175 A 10/2005
JP 2007-261070 A 10/2007
JP 2008-105231 A 5/2008

* cited by examiner

*Primary Examiner* — Lamson Nguyen
(74) *Attorney, Agent, or Firm* — Fish & Richardson P.C.

(57) ABSTRACT

A lyophobic treatment method of imparting lyophobic properties to a surface of a base material having hole sections, includes: an organic film formation step of forming an organic film on the surface of the base material and inner wall faces of the hole sections of the base material; a protective member formation step of forming a protective member on the organic film on the surface of the base material; an organic film removal step of removing the organic film on the inner wall faces of the hole sections of the base material; a protective member removal step of removing the protective member on the organic film on the surface of the base material; and a fluorination step of carrying out fluorination processing of the organic film on the surface of the base material.

22 Claims, 7 Drawing Sheets

*Alkylsilanes*

$CH_3(CH_2)_{11}SiCl_3$
n-dodecyltrichlorosilanc(DDTS:C12)

$CH_3(CH_2)_{15}SiCl_3$
n-hexadecyltrichlorosilanc(HDTS:C16)

$CH_3(CH_2)_{17}SiCl_3$
n-octadecyltrichlorosilanc(OTS:C18)

$CH_3(CH_2)_{21}SiCl_3$
n-dococyltrichlorosilanc(DOTS:C22)

$CH_3(CH_2)_{29}SiCl_3$
n-triacontyltrichlorosilanc(TATS:C30)

LYOPHOBIC TREATMENT METHOD, NOZZLE PLATE, INKJET HEAD AND ELECTRONIC DEVICE

BACKGROUND OF THE INVENTION

1. Field of the Invention

The present invention relates to a lyophobic treatment method, a nozzle plate, an inkjet head and an electronic device, and more particularly, to technology for lyophobic treatment of a surface of a base material having a hole section.

2. Description of the Related Art

In a recording head used in an inkjet recording apparatus (an inkjet head), if ink adheres to the surface of the nozzle plate (in particular, to the periphery of the nozzle openings), then the ink droplets ejected from the nozzles are thereby affected, giving rise to variation in the ejection direction of the ink droplets and making it difficult to deposit the ink droplets at the prescribed positions on the recording medium, and therefore giving rise to decline in image quality.

Therefore, in order to prevent ink from adhering to the surface of the nozzle plate, various methods have been proposed for forming a lyophobic film on the surface of a nozzle plate (also called "nozzle forming substrate" hereinafter).

For example, Japanese Patent Application Publication No. 2007-261070 describes a method according to which a lyophobic film is formed on the surface (ink ejection surface) of a nozzle forming substrate having nozzle holes and on the inner wall faces of the nozzles, whereupon a protective tape (masking tape) is attached to the lyophobic film formed on the surface of the nozzle forming substrate, a plasma process is applied from the rear surface side of the nozzle forming substrate (the side opposite to the ink ejection surface) with this protective tape in an attached state, thereby removing the lyophobic film on the inner wall faces of the nozzles, and the protective tape is then detached from the nozzle forming substrate.

However, as shown in FIG. 9A, in the method described in Japanese Patent Application Publication No. 2007-261070, a lyophobic film 904 is formed on the surface and the inner wall faces of the nozzles of a nozzle forming substrate 900 which has nozzle holes 902, whereupon a protective tape 906 is attached to the lyophobic film 904 on the surface of the nozzle forming substrate 900, but there are cases where the protective tape 906 does not adhere completely to the lyophobic film 904 due to the characteristics of the lyophobic film 904. Consequently, when the lyophobic film 904 is removed from the inner wall faces of the nozzles by plasma processing, as shown in FIG. 9B, the lyophobic film 904 is removed excessively up to the periphery of the openings of the nozzle holes 902 and therefore non-uniformities arise in the lyophobic properties of the surface of the nozzle forming substrate 900 and there is a possibility that the ink ejection performance and maintenance properties decline.

SUMMARY OF THE INVENTION

The present invention has been contrived in view of these circumstances, an object thereof being to provide a lyophobic treatment method whereby lyophobic treatment can be carried out uniformly without irregularities on the surface of a base material having hole sections.

A further object of the present invention is to provide a nozzle plate, an inkjet head and an electronic device having excellent ink ejection performance and maintenance properties, which comprises a base material on which a lyophobic treatment has been carried out by the lyophobic treatment method.

In order to attain an object described above, one aspect of the present invention is directed to a lyophobic treatment method of imparting lyophobic properties to a surface of a base material having hole sections, the lyophobic treatment method comprising: an organic film formation step of forming an organic film on the surface of the base material and inner wall faces of the hole sections of the base material; a protective member formation step of forming a protective member on the organic film on the surface of the base material; an organic film removal step of removing the organic film on the inner wall faces of the hole sections of the base material; a protective member removal step of removing the protective member on the organic film on the surface of the base material; and a fluorination step of carrying out fluorination processing of the organic film on the surface of the base material.

According to this aspect of the invention, after forming an organic film on the surface of the base material and the inner wall faces of the hole sections, a protective film is formed on top of the organic film on the surface of the base material and the organic film on the inner wall faces of the hole sections of the base material is then removed. Since the organic film does not contain a fluorine group, then the protective member bonds completely to the organic film, there are no non-uniformities due to incomplete adhesion of the protective member and excessive removal of the organic film can be prevented. Furthermore, since the organic film on the surface of the base material can be rendered lyophobic by carrying out fluorination processing after removing the protective member, then it is possible to render the surface of the base material lyophobic, uniformly, without irregularities.

In order to attain an object described above, another aspect of the present invention is directed to a lyophobic treatment method of imparting lyophobic properties to a surface of a base material having hole sections, the lyophobic treatment method comprising: a protective film formation step of forming a protective film on the surface of the base material and inner wall faces of the hole sections of the base material; an organic film formation step of forming an organic film on the protective film; a protective member formation step of forming a protective member on the organic film formed on the protective film on the surface of the base material; an organic film removal step of removing the organic film formed on the protective film on the inner wall faces of the hole sections of the base material; a protective member removal step of removing the protective member on the organic film formed on the protective film on the surface of the base material; and a fluorination step of carrying out fluorination processing of the organic film on the protective film on the surface of the base material.

According to this aspect of the invention, after forming a protective film on the surface and the inner wall faces of hole sections of a base material, an organic film is formed on top of the protective film, a protective member is formed on top of the organic film provided on the protective film on the surface of the base material, and the organic film on the protective film on the inner wall faces of the hole sections of the base material is then removed. Since the organic film does not contain a fluorine group, then the protective member bonds completely to the organic film and there are no non-uniformities due to incomplete adhesion of the protective member and excessive removal of the organic film can be prevented. Furthermore, since the organic film provided on the protective film on the surface of the base material can be rendered lyophobic by carrying out fluorination processing after removing the protective member, then it is possible to render the surface of the base material lyophobic, uniformly, without irregularities. Furthermore, the protective film on the inner wall faces of the hole sections can also be used as a protective film against liquid, and therefore reliability can be improved.

In the lyophobic treatment method according to these aspects of the present invention, desirably, the fluorination processing uses a gas containing at least fluorine. Therefore, the portion where the organic film has been formed can be rendered lyophobic selectively and independently, and in a uniform fashion over a large surface area.

Furthermore, in the lyophobic treatment method according to these aspects of the present invention, more desirably, the fluorination processing uses a mixed gas containing fluorine gas and an inert gas. This makes it possible to stabilize the fluorination processing.

Moreover, in the lyophobic treatment method according to these aspects of the present invention, a desirable mode is one where the organic film removal step removes the organic film by means of an irradiation process using an energy beam, such as ultraviolet light or an electron beam, plasma processing (and more desirably, processing by irradiation of plasma based on a gas including oxygen), or ozone gas processing (and more desirably, high-purity ozone gas processing). By means of these processes, it is possible to render the inner wall faces of the hole sections lyophilic at the same time as removing the organic film.

Furthermore, in the lyophobic treatment method according to these aspects of the present invention, desirably, the organic film has at least hydrocarbon, and more desirably, the organic film is an organic silane film. Moreover, a particularly desirable mode is one where the base material is made of silicon. According to these modes, it is possible readily to form an organic film having high adhesiveness.

Furthermore, in the lyophobic treatment method according to these aspects of the present invention, desirably, at least the organic film removal step and the fluorination processing step are carried out in the same chamber. According to this mode, it is possible to improve productivity.

In order to attain an object described above, another aspect of the present invention is directed to a nozzle plate comprising a base material which is imparted with lyophobic properties by one of the lyophobic treatment methods defined above.

In order to attain an object described above, another aspect of the present invention is directed to an inkjet head comprising such a nozzle plate.

In order to attain an object described above, another aspect of the present invention is directed to an electronic device comprising such an inkjet head.

According to the present invention, after forming an organic film on the surface of the base material and the inner wall faces of the hole sections, a protective member is formed on top of the organic film on the surface of the base material and the organic film on the inner wall faces of the hole sections of the base material is then removed. Since the organic film does not contain a fluorine group, then the protective member bonds completely to the organic film and there are no non-uniformities due to incomplete adhesion of the protective member and excessive removal of the organic film can be prevented. Furthermore, since the organic film on the surface of the base material can be rendered lyophobic by carrying out fluorination processing after removing the protective member, then it is possible to render the surface of the base material lyophobic, uniformly, without irregularities.

DESCRIPTION OF THE PREFERRED EMBODIMENTS

General Configuration of Inkjet Recording Apparatus

Figure 1:
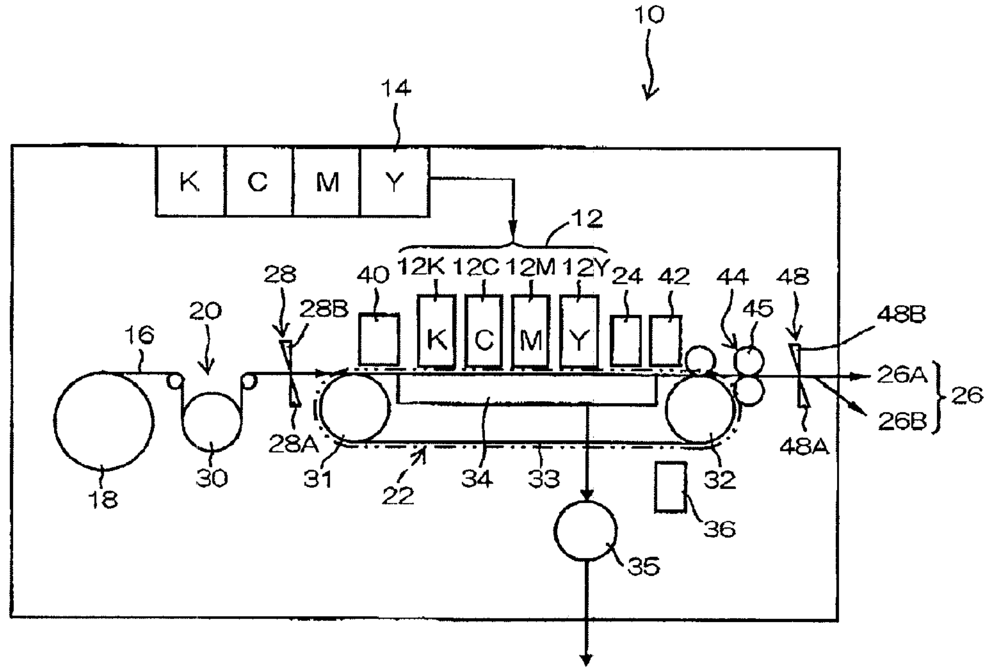
FIG. 1 is a general schematic drawing showing a general view of an inkjet recording apparatus.

FIG. 1 is a general configuration diagram of one embodiment of an inkjet recording apparatus according to an embodiment of the present invention. As illustrated in FIG. 1, the inkjet recording apparatus 10 comprises: a printing unit 12 having a plurality of inkjet heads (hereafter, also simply called "heads") 12K, 12C, 12M, and 12Y provided for the respective ink colors; an ink storing and loading unit 14 for storing inks of K, C, M and Y to be supplied to the printing heads 12K, 12C, 12M, and 12Y; a paper supply unit 18 for supplying recording paper 16; a decurling unit 20 removing curl in the recording paper 16; a suction belt conveyance unit 22 disposed facing the nozzle face (ink-droplet ejection face) of the printing unit 12, for conveying the recording paper 16 while keeping the recording paper 16 flat; a print determination unit 24 for reading the printed result produced by the printing unit 12; and a paper output unit 26 for outputting image-printed paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of the configuration in which roll paper is used, a cutter 28 is provided as illustrated in FIG. 1, and the continuous paper is cut into a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut papers are used, the cutter 28 is not required.

In the case of a configuration in which a plurality of types of recording paper can be used, it is desirable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is desirably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane.

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as illustrated in FIG. 1. The suction chamber 34 provides suction with a fan 35 to generate a negative pressure, and the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, and a combination of these. In the case of the configuration in which the belt 33 is nipped with the cleaning rollers, it is desirable to make the line velocity of the cleaning rollers different from that of the belt 33 to improve the cleaning effect.

A roller nip conveyance mechanism, in place of the suction belt conveyance unit 22, can be employed. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is desirable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
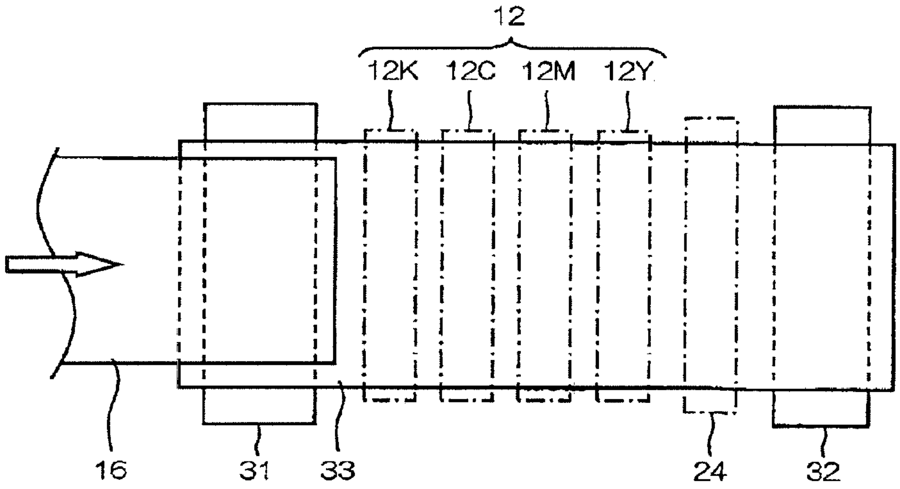
FIG. 2 is a principal plan diagram of the peripheral area of a printing unit in the inkjet recording apparatus illustrated in FIG. 1.

The printing unit 12 is a so-called "full line head" in which a line head having a length corresponding to the maximum paper width is arranged in a direction (main scanning direction) that is perpendicular to the paper conveyance direction (sub scanning direction). Each of the printing heads 12K, 12C, 12M, and 12Y constituting the printing unit 12 is constituted by a line head, in which a plurality of ink ejection ports (nozzles) are arranged along a length that exceeds at least one side of the maximum-size recording paper 16 intended for use in the inkjet recording apparatus 10 (see FIG. 2).

The printing heads 12K, 12C, 12M, and 12Y are arranged in the order of black (K), cyan (C), magenta (M), and yellow (Y) from the upstream side, along the feed direction of the recording paper 16 (hereinafter, referred to as the sub-scanning direction). A color image can be formed on the recording paper 16 by ejecting the inks from the printing heads 12K, 12C, 12M, and 12Y, respectively, onto the recording paper 16 while conveying the recording paper 16.

By adopting the printing unit 12 in which the full line heads covering the full paper width are provided for the respective ink colors in this way, it is possible to record an image on the full surface of the recording paper 16 by performing just one operation of relatively moving the recording paper 16 and the printing unit 12 in the paper conveyance direction (the sub-scanning direction), in other words, by means of a single sub-scanning action. Higher-speed printing is thereby made possible and productivity can be improved in comparison with a shuttle type head configuration in which a head reciprocates in a direction (the main scanning direction) orthogonal to the paper conveyance direction.

Although the configuration with the KCMY four standard colors is described in the present embodiment, combinations of the ink colors and the number of colors are not limited to those. Light inks or dark inks can be added as required. For example, a configuration is possible in which heads for ejecting light-colored inks such as light cyan and light magenta are added. Furthermore, there are no particular restrictions of the sequence in which the heads of respective colors are arranged.

As illustrated in FIG. 1, the ink storing and loading unit 14 has tanks for storing the inks of K, C, M and Y to be supplied to the heads 12K, 12C, 12M, and 12Y, and the tanks are connected to the heads 12K, 12C, 12M, and 12Y by means of channels, which are omitted from figures. The ink storing and loading unit 14 has a warning device (for example, a display device or an alarm sound generator) for warning when the remaining amount of any ink is low, and has a mechanism for preventing loading errors among the colors.

The print determination unit 24 has an image sensor (line sensor) for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the heads 12K, 12C, 12M, and 12Y for the respective colors, and the ejection of each head is determined. The ejection determination includes measurement of the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is desirable to avoid contact with the printed surface until the printed ink dries, and a device that blows heated air onto the printed surface is desirable.

In cases in which printing is performed with dye-based ink on porous paper, blocking the pores of the paper by the application of pressure prevents the ink from coming contact with ozone and other substances that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are desirably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not illustrated in FIG. 1, the paper output unit 26A for the target prints is provided with a sorter for collecting prints according to print orders.

Structure of the Head

Next, the structure of heads 12K, 12C, 12M and 12Y will be described. The heads 12K, 12C, 12M and 12Y of the respective ink colors have the same structure, and a reference numeral 50 is hereinafter designated to any of the heads.

Figure 3A:
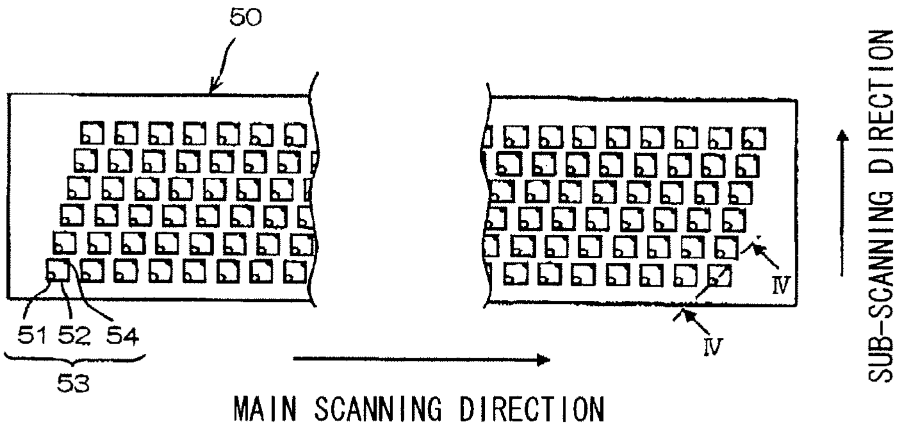
FIGS. 3A to 3C are plan view perspective diagrams showing examples of the composition of a printing head.
Figure 3B:
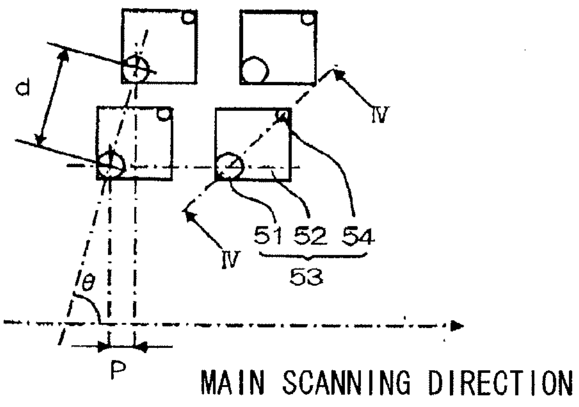
Figure 3C:
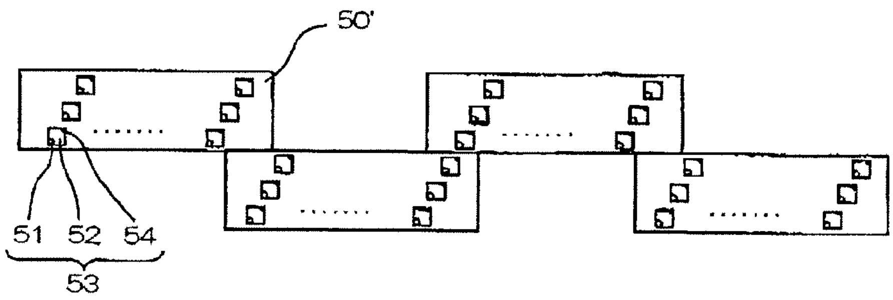
Figure 4:
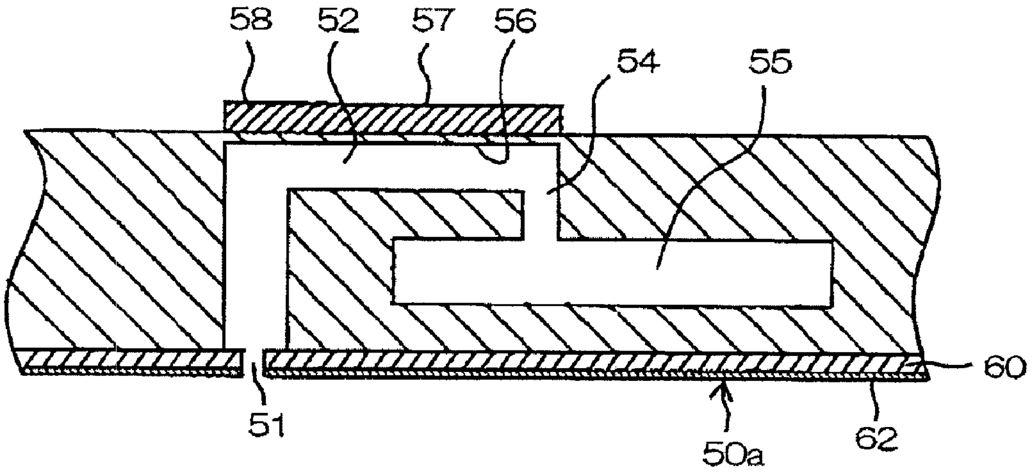
FIG. 4 is a cross-sectional diagram along line IV-IV in FIGS. 3A and 3B.

FIG. 3A is a plan perspective diagram showing an example of the structure of a head 50, and FIG. 3B is a partial enlarged diagram of same. Moreover, FIG. 3C is a plan view perspective diagram showing a further example of the structure of the head 50. FIG. 4 is a cross-sectional diagram showing the composition of an ink chamber unit (a cross-sectional diagram along line IV-IV in FIGS. 3A and 3B). Furthermore, FIGS. 5A to 5E are flow channel composition diagrams showing the structure of flow channels inside the head 50 (a plan view perspective diagram in direction A in FIG. 4).

The nozzle pitch in the head 50 should be minimized in order to maximize the density of the dots formed on the surface of the recording paper. As illustrated in FIGS. 3A and 3B, the head 50 according to the present embodiment has a structure in which a plurality of ink chamber units 53, each comprising a nozzle 51 forming an ink droplet ejection hole, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the main scanning direction perpendicular to the paper conveyance direction) is reduced and high nozzle density is achieved.

The mode of forming one or more nozzle rows through a length corresponding to the entire width of the recording paper 16 in a direction substantially perpendicular to the paper conveyance direction is not limited to the example described above. For example, instead of the configuration in FIG. 3A, as illustrated in FIG. 3C, a line head having nozzle rows of a length corresponding to the entire width of the recording paper 16 can be formed by arranging and combining, in a staggered matrix, short head blocks (head chips) 50' having a plurality of nozzles 51 arrayed in a two-dimensional fashion. Furthermore, although not shown in the drawings, it is also possible to compose a line head by arranging short heads in one row.

As shown in FIG. 4, the nozzles 51 are formed in a nozzle plate 60 which constitutes an ink ejection surface 50*a* of the head 50. The nozzle plate 60 is made of a silicon material, such as Si, $SiO_2$, SiN or quartz glass, a metal material such as Al, Fe, Ni, Cu or an alloy of these, an oxide material such as alumina or iron oxide, a carbonaceous material such as carbon black or graphite, or a resin material such as polyimide.

Furthermore, a lyophobic film 62 having lyophobic properties with respect to ink is formed on the surface of the nozzle plate 60 (ink ejection surface) in order to prevent the adherence of ink. A method of forming the lyophobic film 62 of this kind is described in detail below.

The pressure chambers 52 provided corresponding to the respective nozzles 51 are approximately square-shaped in planar form, and a nozzle 51 and a supply port 54 are provided respectively at either corner of a diagonal of each pressure chamber 52. Each pressure chamber 52 is connected via the supply port 54 to a common flow channel 55. The common channel 55 is connected to ink supply tanks (not illustrated) forming an ink supply source, and the ink supplied from the ink supply tanks is distributed and supplied to each pressure chamber 52 via the common channel 55.

Piezoelectric elements 58 respectively provided with individual electrodes 57 are bonded to a diaphragm 56 which forms the upper face of the pressure chambers 52 and also serves as a common electrode, and each piezoelectric element 58 is deformed when a drive voltage is supplied to the corresponding individual electrode 57, thereby causing ink to be ejected from the corresponding nozzle 51. When ink is ejected, new ink is supplied to the pressure chambers 52 from the common flow channel 55, via the ink inlet ports 54.

In the present example, a piezoelectric element 58 is used as an ink ejection force generating device which causes ink to be ejected from a nozzle 50 provided in a head 51, but it is also possible to employ a thermal method in which a heater is provided inside the pressure chamber 52 and ink is ejected by using the pressure of the film boiling action caused by the heating action of this heater.

As illustrated in FIG. 3B, the high-density nozzle head according to the present embodiment is achieved by arranging a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of θ with respect to the main scanning direction, the pitch P of the nozzles projected so as to align in the main scanning direction is d×cos θ, and hence the nozzles 51 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

When implementing the present invention, the arrangement structure of the nozzles is not limited to the example shown in the drawings, and it is also possible to apply various other types of nozzle arrangements, such as an arrangement structure having one nozzle row in the sub-scanning direction.

Furthermore, the scope of application of the present invention is not limited to a printing system based on a line type of head, and it is also possible to adopt a serial system where a short head which is shorter than the breadthways dimension of the recording paper 16 is scanned in the breadthways direction (main scanning direction) of the recording paper 16, thereby performing printing in the breadthways direction, and when one printing action in the breadthways direction has been completed, the recording paper 16 is moved through a prescribed amount in the direction perpendicular to the breadthways direction (the sub-scanning direction), printing in the breadthways direction of the recording paper 16 is carried out in the next printing region, and by repeating this sequence, printing is performed over the whole surface of the printing region of the recording paper 16.

Lyophobic Treatment Method

Next, examples of a lyophobic treatment method relating to embodiments (first and second embodiments) of the present invention will be described.

First Embodiment

Figure 5A:
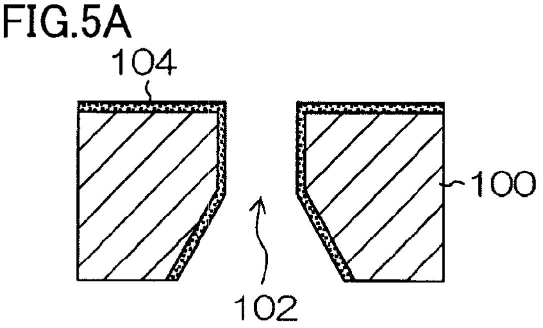
FIGS. 5A to 5E are illustrative diagrams showing a lyophobic treatment method relating to a first embodiment.
Figure 5B:
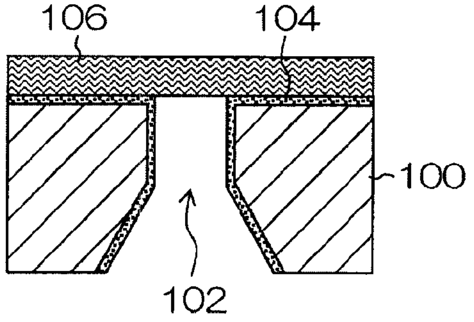
Figure 5C:
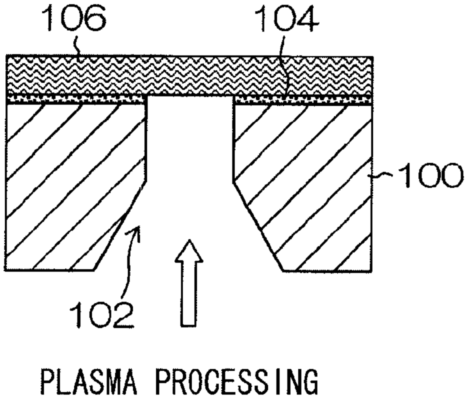
Figure 5D:
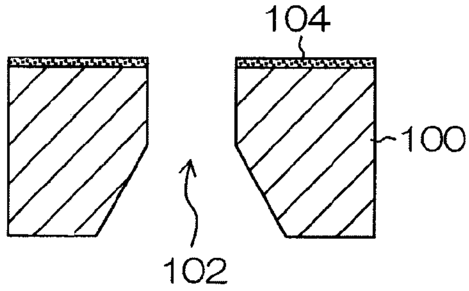
Figure 5E:
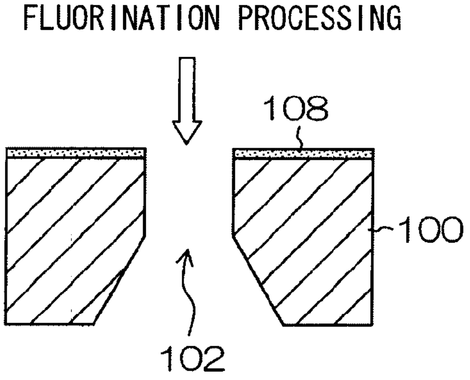

FIGS. 5A to 5E are illustrative diagrams showing a lyophobic treatment method relating to a first embodiment. Here, a method of forming a lyophobic film 108 (corresponding to the lyophobic film 62 in FIG. 4) on the surface (ink ejection surface) of a nozzle forming substrate 100 (corresponding to the nozzle plate 60 in FIG. 4) which has nozzle holes 102, as shown in FIG. 5E, will be described as a lyophobic treatment method.

The lyophobic treatment method relating to the present embodiment comprises: a step of forming an organic film 104 on the surface of the nozzle forming substrate 100 and the inner wall faces of the nozzles (organic film forming step); a step of forming a protective member 106 on the organic film 104 on the surface of the nozzle forming substrate 100 (protective member forming step); a step of removing the organic film 104 on the inner wall faces of the nozzles by carrying out plasma processing from the rear surface side of the nozzle forming substrate 100 (organic film removal step); a step of removing the protective member 106 on the organic film 104 on the surface of the nozzle forming substrate 100 (protective member removal step); and a step of fluorination processing of the organic film 104 on the surface of the nozzle forming substrate 100 (fluorination processing step). The respective steps are described below.

Organic Film Forming Step

Firstly, as shown in FIG. 5A, an organic film 104 is formed on the surface (ink ejection surface) of the nozzle forming substrate 100 having nozzle holes 102 and on the inner wall faces of the nozzles.

The organic film 104 used in the present embodiment is an organic film which does not contain a fluorine group, and more specifically, an organic film having at least hydrocarbon (in other words, a CH type film). For example, if the nozzle forming substrate 100 is made of silicon, then an organic silane type film is desirable as the organic film 104 because of the high adhesive properties and easy formation. The organic silane film forms a siloxane bond with the nozzle forming substrate made of silicon, and has high adhesiveness. Examples of starting materials for forming an organic silane film are materials containing a reactive functional group, such as ethoxysilane, methoxysilane, chlorosilane, and the like, and materials such as those shown in FIG. 6, and the like, can be used as examples of a chlorosilane starting material having high hydrolyzability. Moreover, it is possible to employ an organic film having a polysiloxane skeleton, as described in Japanese Patent Application Publication No. 2008-105231, for example.

The material of the nozzle forming substrate 100 may be a metal material, inorganic material or organic material, and the organic film 104 should be selected appropriately in accordance with the material of the nozzle forming substrate 100.

The method of forming the organic film 104 is not limited in particular, provided that the method enables the organic film to be removed by plasma processing after being formed. Suitable methods are, for example, dry processes such as physical vapor phase epitaxy (vapor deposition, sputtering, or the like) or chemical vapor phase epitaxy (CVD, ALD, or the like), or wet processes such as a coating method, sol gelation, or the like, and it should be possible to form an organic film having at least hydrocarbon by means of any one of these methods.

Of these, a dry process method such as CVD is particularly desirable. By forming an organic film 104 by a dry process, it is possible to form a uniform film even on the inner wall faces of very fine and complex flow channels, such as the nozzle holes 102.

Moreover, it is desirable to carry out pre-processing of the organic film forming surfaces of the nozzle forming substrate 100 (in other words, the surface and the inner wall faces of the nozzles) before forming the organic film 104. This makes it possible to improve the adhesion between the nozzle forming substrate 100 and the organic film 104. For example, if a nozzle forming substrate 100 made of silicon is used, then adhesiveness with the organic film 104 (organic silane film, or the like) can be enhanced by carrying out pre-processing through irradiation of an oxygen plasma ($O_2$ plasma).

There are no particular restrictions on the shape of the nozzle holes 102, but from the viewpoint of stabilizing ejection, it is desirable that the nozzles should have a tapered shape or a funnel shape which narrows toward the ink ejection direction (the upward direction in FIGS. 5A to 5E) (funnel-shaped nozzle holes are depicted as one example in FIGS. 5A to 5E).

Protective Member Forming Step

After forming the organic film 104, as shown in FIG. 5B, a protective member 106 is formed on the organic film 104 on the surface of the nozzle forming substrate 100. For example, it is possible to use, for the protective member 106, a resin member such as an ultraviolet-curable resin, a metal or ceramic jig which covers and protects the nozzle surface, a protective tape, such as masking tape, or the like. A tape-shaped member is desirable, due to having excellent handling properties and enabling easy formation and detachment. More specifically, the protective tape may be attached on top of the organic film 104 on the surface of the nozzle forming substrate 100.

In the present embodiment, a desirable mode is one which uses a masking tape having a detachable (removable) acrylic adhesive on the surface of a base material, as the protective member 106. According to this mode, since a technique for attaching a masking tape is employed rather than forming a protective member, then productivity is high, and since a solvent such as butyl acetate is not used, then problems of environmental impact do not arise. Furthermore, since a masking tape having a detachable acrylic adhesive on the surface of a base material is used, then the masking tape can be detached easily and therefore productivity is high in this respect as well.

A more desirable mode is one where the base material of the masking tape is constituted by a polyester film or polyethylene film. In the lyophobic treatment method according to an embodiment of the present invention, it is possible to use various materials as the base material of the masking tape, but it is also possible to maintain the strength of the tape even after the effects of plasma processing, by using polyester film or polyethylene film as the base material of the masking tape.

In the present embodiment, since an organic film which does not contain a fluorine group is used as the organic film 104 as described above, then it is possible to make the protective member 106 completely adhere without non-uniformities to the organic film 104 on the surface of the nozzle forming substrate 100. Thereby, it is possible to prevent the organic film 104 on the surface of the nozzle forming substrate 100 from being removed excessively by the plasma processing described below.

Organic Film Removal Step

After forming the protective member 106, as shown in FIG. 5C, plasma processing is carried out from the rear surface side of the nozzle forming substrate 100 (the opposite surface to the ink ejection surface). For example, as described in the specification of Japanese Patent Application Publication No. 2007-261070, plasma processing may be carried out for 5 to 20 seconds using argon gas formed into a plasma at atmospheric pressure, at 120 to 180 W and the flow rate of 45 to 75 sccm. Consequently, the portion of the organic film which is not masked by the protective member 106 is decomposed by the argon gas converted into a plasma, and the organic film 104 can thus be removed from the inner wall faces of the nozzles. Furthermore, the gas which can be used for the plasma should have little effect on the nozzle forming substrate 100 and should be capable of removing the organic film 104. For example, this gas is an inert gas such as argon or helium, or nitrogen, oxygen or a mixture of these, or the like.

The method of removing the organic film 104 is not limited to the plasma process described above, and an irradiation process using an energy beam of ultraviolet light or an electron beam, or ozone gas processing (more desirably, a high-purity ozone gas process), for example, are desirable, and similar beneficial effects to a plasma process can be obtained.

Protective Member Removal Step

After the plasma process, as shown in FIG. 5D, the protective member 106 on the organic film 104 on the surface of the nozzle forming substrate 100 is removed. For example, if a masking tape having a detachable acrylic adhesive is used as the protective member 106, then it is possible readily to detach the masking tape which has been attached to the organic film 104 on the surface of the nozzle forming substrate 100, and therefore productivity can be raised.

Fluorination Processing Step

Figures 6, 7:
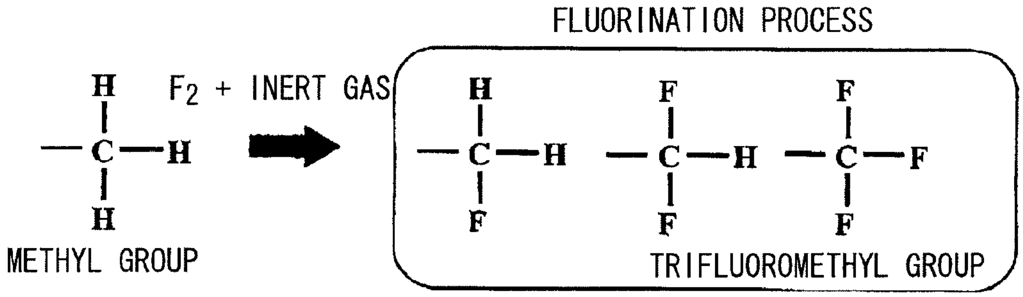
FIG. 6 is a diagram showing examples of an organic film used in an embodiment of the present invention.
FIG. 7 is an illustrative diagram showing an aspect of a fluorination process.

After the protective member 106 has been removed, as shown in FIG. 5E, the organic film 104 on the surface of the nozzle forming substrate 100 is subjected to a fluorination process. For example, if OTS (octadecyl trichlorosilane) as shown in FIG. 6 is formed on the surface of a silicon nozzle forming substrate 100 as an organic film 104, then since the OTS contains a $CH_3$ group and a CH group, fluorination may be carried out by reacting a mixed gas of fluorine gas and nitrogen gas (inert gas) directly with the OTS (see FIG. 7).

The fluorination process may be based on reaction with elemental (simple) fluorine gas, but as described in Japanese Patent Application Publication No. 2005-279175, since fluorine gas has high reactivity, then if the film is reacted directly with elemental fluorine gas, the reaction occurs too violently and even the C—C bond in the main chain can be broken.

Therefore, in the present embodiment, fluorine gas is introduced into the reaction vessel (furnace) as a mixed gas combined with an inert gas such as helium, argon or nitrogen, and desirably, the reaction with fluorine gas is carried out at any temperature within a range that does not produce deformation or corrosion of the nozzle forming substrate 100. Furthermore, desirably, the fluorine gas concentration in the mixed gas in this case is equal to or greater than 0.01%. The extent of fluorination can be controlled by means of the concentration of the fluorine gas, the temperature of the reaction vessel and the reaction time.

A specific example of a fluorination process is described in Japanese Patent Application Publication No. 2005-54067 and Japanese Patent Application Publication No. 2004-143622. More specifically, a base material on which an organic film has been formed (in the present embodiment, the nozzle forming substrate 100 after the protective member removal step) is introduced into a processing vessel, and the processing vessel is reduced to a pressure of 100 Pa or lower. Next, the atmosphere is substituted with an inert gas, such as nitrogen gas. Thereupon, fluorine gas is introduced into the vessel to a concentration of 0.1 to 99%. In this case, the pressure of the fluorine gas is desirably 1 to 1000 kPa. The processing time during which fluorine gas is brought into contact with the base material is 1 second to 10 days, and more desirably, 10 minutes to 10 hours. The processing temperature is −50° C. to 300° C., and more desirably, 0° C. to 100° C. Furthermore, the fluorine penetration depth becomes greater, the longer the time is in the case of the same temperature, and also becomes greater, the higher the temperature is in the case of the same time.

In this way, as shown in FIG. 5E, the lyophobic film 108 (corresponding to an organic film 104 which has undergone a fluorination process) is formed on the surface of the nozzle forming substrate 100.

According to the present embodiment, after forming an organic film 104 on the surface and the inner wall faces of the nozzle forming substrate 100, a protective member 106 is formed on the organic film 104 on the surface of the nozzle forming substrate 100, and the organic film 104 on the inner wall faces of the nozzles in the nozzle forming substrate 100 is then removed by carrying out a plasma process from the rear surface side of the nozzle forming substrate 100. In this case, since the organic film 104 does not contain a fluorine group, then the protective member 106 bonds completely to the organic film 104, there are no non-uniformities due to incomplete adhesion of the protective member 106, and the organic film 104 on the surface of the nozzle forming substrate 100 (in particular, the peripheral portions of the openings of the nozzle holes 102) is not removed excessively. In other words, it is possible to prevent excessive removal of the organic film 104 by means of the plasma processing. Furthermore, in the case of plasma processing by means of a gas containing oxygen, it is possible to render the inner wall faces of the nozzles lyophilic simultaneously with removing the organic film 104, and hence productivity can be improved.

After removing the protective member 106, by carrying out a fluorination process by means of a fluorine gas, it is possible to render only the organic film 104 on the surface of the nozzle forming substrate 100 lyophobic, selectively, and in a uniform fashion over a large surface area. Consequently, it is possible to form a uniform lyophobic film 108 without irregularities on the surface of the nozzle forming substrate 100. Furthermore, by using fluorination processing based a fluorine gas, a simple process which can be controlled by means of the temperature and reaction time only is achieved.

In the present embodiment, a desirable mode is one where the plasma processing and the fluorination processing are carried out in the same chamber. Although gas substitution is required, it is possible to carry out a series of processes inside the same chamber and therefore productivity can be improved and contamination can be reduced.

In the present embodiment, a mode is described in which a protective tape, such as masking tape, is used as the protective member 106, but the present invention is not limited to this. For example, possible modes are one which uses an elastic sheet made of silicone rubber or fluorine rubber, and one which uses a dry film. However, in the former mode, productivity is poor, and in the latter mode, after removing the organic film 104 on the inner wall faces of the nozzles, the dry film should be dissolved and removed by butyl acetate, and there are issues relating to environmental impact. On the other hand, a mode using a protective tape (more desirably, a masking tape having detachable acrylic adhesive) as the protective member 106 as in the present embodiment is desirable since the productivity is good and there are no problems in relation to environmental impact.

Second Embodiment

FIGS. 8A to 8F are illustrative diagrams showing a lyophobic treatment method relating to a second embodiment. In FIGS. 8A to 8E, elements which are the same as or similar to FIGS. 5A to 5E are labelled with the same reference numerals and description thereof is omitted here.

Figure 8A:
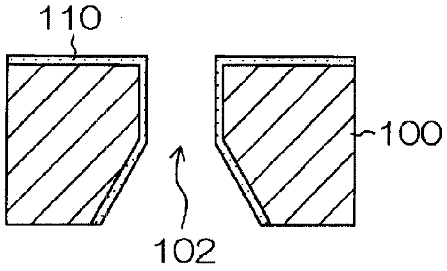
FIGS. 8A to 8F are illustrative diagrams showing a lyophobic treatment method relating to a second embodiment.
Figure 8B:
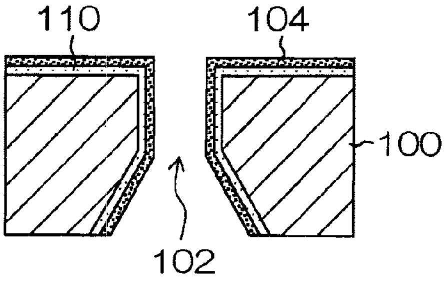

In the second embodiment, before forming the organic film 104 in the first embodiment, a protective film 110 is formed on the surface of the nozzle forming substrate 100 and on the inner wall faces of the nozzles, as shown in FIG. 8A. The method of forming the protective film 110 may be sputtering, vapor deposition, CVD, thermal oxidation, plasma polymerization, or the like. For example, if a nozzle forming substrate 100 made of silicon is used, then a silicon oxide film, a silicon nitride film or a thermal oxide film is formed by CVD, or the like.

In the present embodiment, there are no particular restrictions on the constituent materials of the protective film 110, and it is possible to employ a metal material, organic material, inorganic material, or a composite of these materials.

Figure 8C:
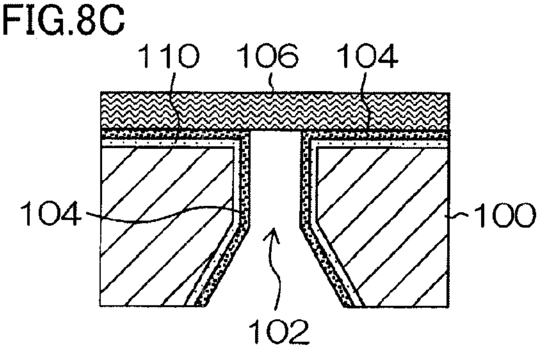
Figure 8D:
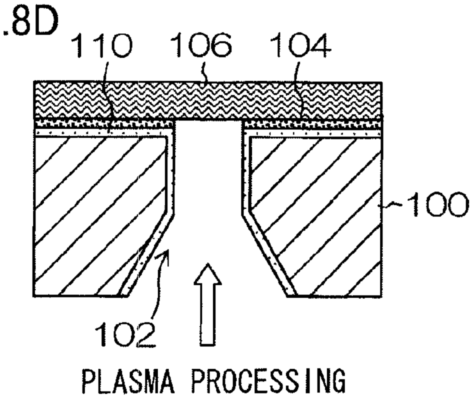
Figure 8E:
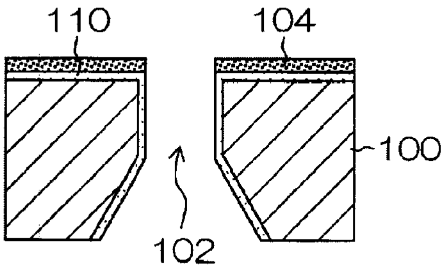

After forming the protective film 110, a similar method to that of the first embodiment is followed. To give a brief description of the steps after formation of the protective film 110, an organic film 104 is formed on the protective film 110 formed as described above (FIG. 8B), whereupon a protective member 106 is formed on the organic film 104 provided on the protective film 110 on the surface of the nozzle forming substrate 100 (FIG. 8C). Thereupon, the organic film 104 provided on the protective film 110 on the inner wall faces of the nozzles is removed by carrying out plasma processing from the rear surface side of the nozzle forming substrate 100 (FIG. 8D). In this case, the protective film 110 on the inner wall faces of the nozzles is not removed, but rather left in place. Furthermore, since the protective member 106 bonds completely to the organic film 104 without any non-uniformities, then excessive removal of the organic film by the plasma processing is prevented.

Figure 8F:
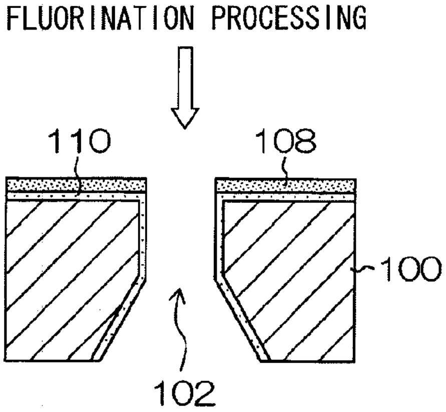
Figure 9A:
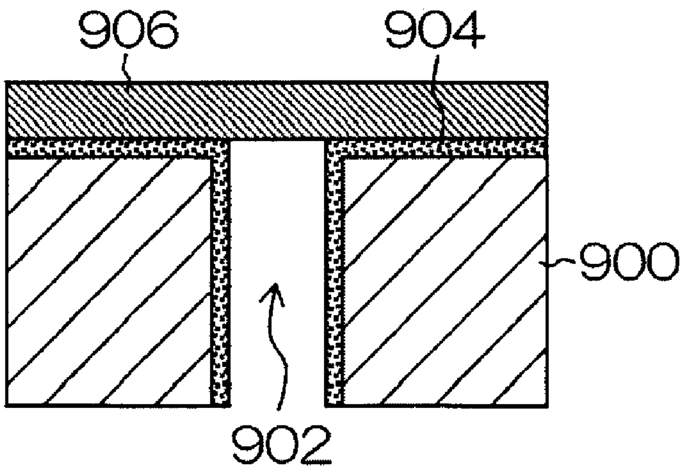
FIG.9A RELATED ART
FIGS. 9A and 9B are illustrative diagrams showing issues relating to a related art.
Figure 9B:
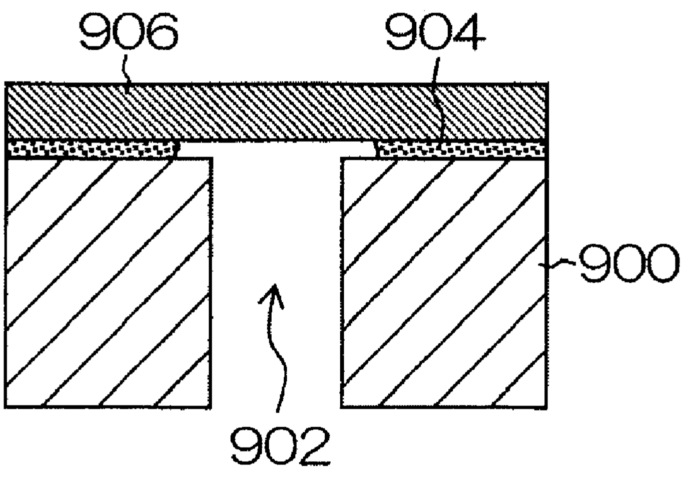
FIG.9B RELATED ART

After removing the organic film 104 provided on the protective film 110 on the inner wall faces of the nozzles by plasma processing, the protective member 106 is removed (FIG. 8E), and a fluorination process of the organic film 104 formed on the protective film 110 of the nozzle forming substrate 100 is carried out (FIG. 8F). In this way, a lyophobic film 108 (corresponding to an organic film 104 which has been subjected to a fluorination process) is formed via the protective film 110 on the surface of the nozzle forming substrate 100.

According to the second embodiment, similar beneficial effects to the first embodiment are obtained, and furthermore, since the protective film 110 on the inner wall faces of the nozzles functions as an ink resistant protective film, it is possible to improve reliability. Moreover, if the protective film 110 is made of silicon oxide, or the like, the density of the processed section is raised by the plasma processing, and the ink resistance can be improved yet further, simultaneously with the removal of the organic film 104, thus making it possible to improve lyophilic properties.

Here, a method of performing lyophobic treatment of the surface of a nozzle forming substrate 100 having nozzle holes 102 is described as one example of the lyophobic treatment method relating to an embodiment of the present invention, but the present invention is not limited to this and can also be applied similarly to performing a lyophobic treatment on the surface of a substrate (structural body) in which hole sections such as ink flow channels are formed.

Lyophobic treatment methods, nozzle plates, inkjet heads and electronic devices according to embodiments of the present invention have been described in detail above, but the present invention is not limited to the aforementioned examples, and it is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lyophobic treatment method of imparting lyophobic properties to a surface of a base material having hole sections, the lyophobic treatment method comprising:

an organic film formation step of forming an organic film on the surface of the base material and inner wall faces of the hole sections of the base material;

a protective member formation step of forming a protective member on the organic film on the surface of the base material;

an organic film removal step of removing the organic film on the inner wall faces of the hole sections of the base material;

a protective member removal step of removing the protective member on the organic film on the surface of the base material; and a fluorination step of carrying out fluorination processing of the organic film on the surface of the base material.

2. The lyophobic treatment method as defined in claim 1, wherein the fluorination processing uses a gas containing at least fluorine.

3. The lyophobic treatment method as defined in claim 2, wherein the fluorination processing uses a mixed gas containing fluorine gas and inert gas.

4. The lyophobic treatment method as defined in claim 1, wherein the organic film is removed by plasma processing, irradiation processing using an energy beam, or ozone gas processing, in the organic film removal step.

5. The lyophobic treatment method as defined in claim 1, wherein the organic film contains at least hydrocarbon.

6. The lyophobic treatment method as defined in claim 5, wherein the organic film is an organic silane film.

7. The lyophobic treatment method as defined in claim 6, wherein the base material is made of silicon.

8. The lyophobic treatment method as defined in claim 1, wherein at least the organic film removal step and the fluorination step are carried out in a same chamber.

9. A nozzle plate comprising a base material which is imparted with lyophobic properties by the lyophobic treatment method defined in claim 1.

10. An inkjet head comprising the nozzle plate defined in claim 9.

11. An electronic device comprising the inkjet head defined in claim 10.

12. A lyophobic treatment method of imparting lyophobic properties to a surface of a base material having hole sections, the lyophobic treatment method comprising:

a protective film formation step of forming a protective film on the surface of the base material and inner wall faces of the hole sections of the base material;

an organic film formation step of forming an organic film on the protective film;

a protective member formation step of forming a protective member on the organic film formed on the protective film on the surface of the base material;

an organic film removal step of removing the organic film formed on the protective film on the inner wall faces of the hole sections of the base material;

a protective member removal step of removing the protective member on the organic film formed on the protective film on the surface of the base material; and a fluorination step of carrying out fluorination processing of the organic film on the protective film on the surface of the base material.

13. The lyophobic treatment method as defined in claim 12, wherein the fluorination processing uses a gas containing at least fluorine.

14. The lyophobic treatment method as defined in claim 13, wherein the fluorination processing uses a mixed gas containing fluorine gas and inert gas.

15. The lyophobic treatment method as defined in claim 12, wherein the organic film is removed by plasma processing, irradiation processing using an energy beam, or ozone gas processing, in the organic film removal step.

16. The lyophobic treatment method as defined in claim 12, wherein the organic film contains at least hydrocarbon.

17. The lyophobic treatment method as defined in claim 16, wherein the organic film is an organic silane film.

18. The lyophobic treatment method as defined in claim 17, wherein the base material is made of silicon.

19. The lyophobic treatment method as defined in claim 12, wherein at least the organic film removal step and the fluorination step are carried out in a same chamber.

20. A nozzle plate comprising a base material which is imparted with lyophobic properties by the lyophobic treatment method defined in claim 12.

21. An inkjet head comprising the nozzle plate defined in claim 20.

22. An electronic device comprising the inkjet head defined in claim 21.

* * * * *